(No Model.) 2 Sheets—Sheet 1.
L. B. STILLWELL & C. F. SCOTT.
INSULATING CONDUIT FOR ELECTRIC CONDUCTORS.
No. 535,084. Patented Mar. 5, 1895.
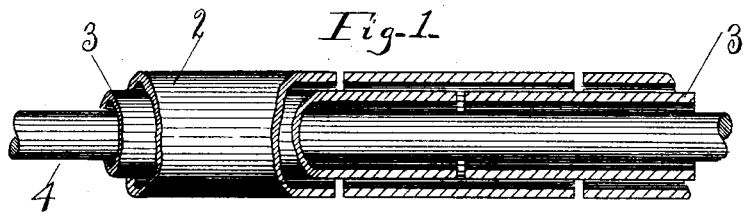
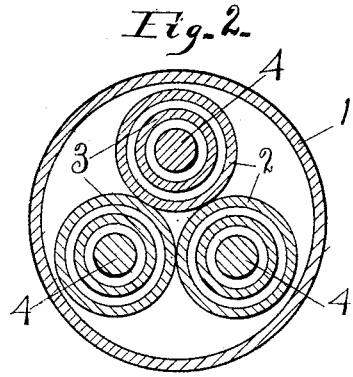 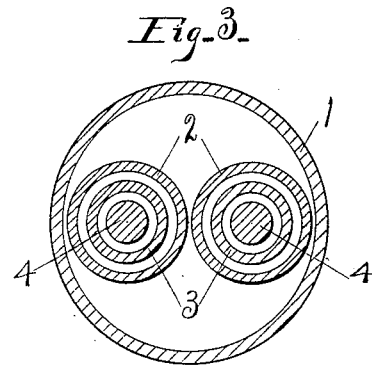
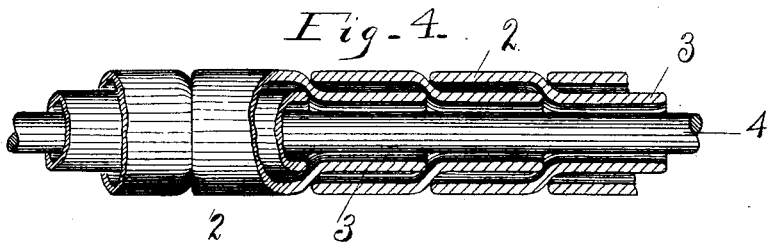
WITNESSES:
G. H. Winslow.
H. C. Tener.
INVENTORS
L. B. Stillwell & C. F. Scott
BY
Terry and MacKaye
ATTORNEYS.

(No Model.) 2 Sheets—Sheet 2.
L. B. STILLWELL & C. F. SCOTT.
INSULATING CONDUIT FOR ELECTRIC CONDUCTORS.
No. 535,084. Patented Mar. 5, 1895.
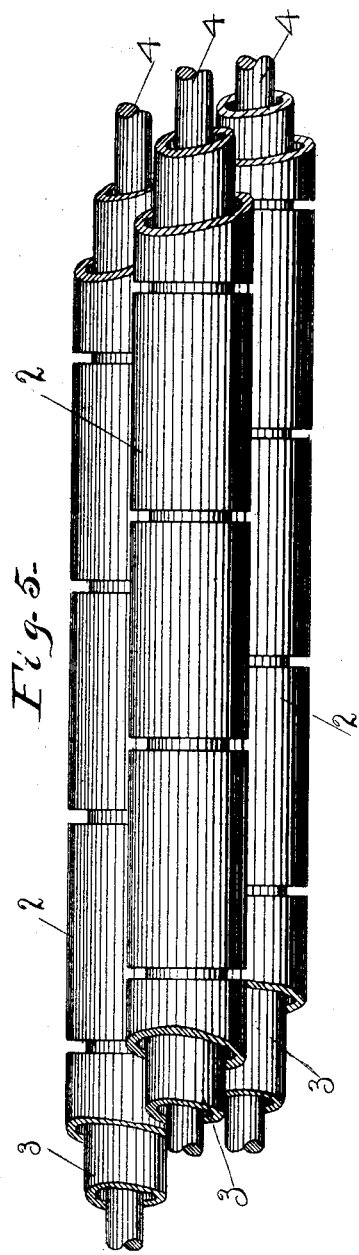
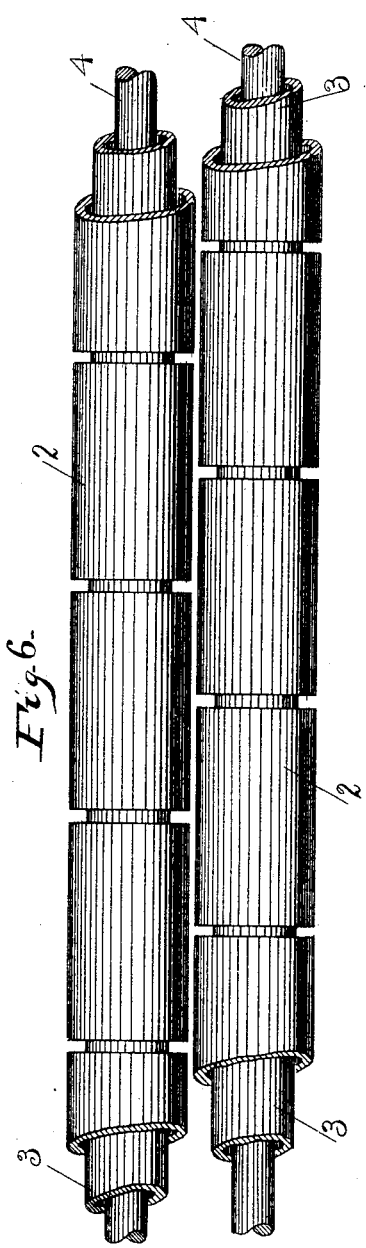

UNITED STATES PATENT OFFICE.

LEWIS B. STILLWELL AND CHARLES F. SCOTT, OF PITTSBURG, PENNSYLVANIA, ASSIGNORS TO THE WESTINGHOUSE ELECTRIC AND MANUFACTURING COMPANY, OF SAME PLACE.

INSULATING-CONDUIT FOR ELECTRIC CONDUCTORS.

SPECIFICATION forming part of Letters Patent No. 535,084, dated March 5, 1895.

Application filed October 25, 1894. Serial No. 526,962. (No model.)

*To all whom it may concern:*

Be it known that we, LEWIS B. STILLWELL and CHARLES F. SCOTT, citizens of the United States, residing in Pittsburg, in the county of Allegheny and State of Pennsylvania, have invented a new and useful Improvement in Insulating-Conduits for Electric Conductors, (Case No. 614,) of which the following is a specification.

Our invention relates to that class of apparatus which is employed for insulating and protecting electric conductors used for the transmission of electric energy, and more particularly to such apparatus as is designed to be employed for long-distance transmission of such energy; and it has for its object the production of an insulating and protecting means which may be used in connection with conductors employed for the transmission of currents of extremely high tension without danger of destruction or material deterioration.

The use of solid insulating material as a sole means for insulating and protecting high potential circuits is open to objection for the reason that the air contained in any cracks or joints which might be formed in the material would facilitate the action of any electric strains that might be exerted and a further disruption of the material be thus effected. A further objection to solid insulating material in such relation is, that any deterioration or breaking down which might occur would be in no sense or degree self-repairing, but would tend to increase, as has been already stated. On the other hand, if liquid insulating material be temporarily ruptured at any point, it is self-repairing in the sense that it immediately resumes its original position, and approximately its original condition as well. Several liquids, such as oils, glycerine, &c., are well adapted for insulating purposes, and of these, oil is perhaps the most available and for certain reasons the best adapted for such purposes, but it is likely to contain either solid or liquid impurities which may become so disposed and arranged as to form, to a greater or less extent, a conducting path for the electric current. In view of this possible objection to oil as the insulating material to be employed, we propose to use in connection therewith a non-conducting tube of solid material, thus securing the advantages of both liquid and solid insulation, and by a peculiar combination and arrangement of the parts, avoid the objections incident to the use of either of such materials alone. We have found glass to be a suitable and desirable material from which to construct such insulating tubes; but by reason of the character of this material and the impracticability of making an unbroken length of tubing therefrom, we propose to employ a plurality of telescoping sets of comparatively short lengths of tubing and to so arrange these lengths that they shall break joints with each other. We also propose to inclose the conductor or conductors and their surrounding tubing in a supporting and protecting pipe, and to fill the entire space in and around the sectional tubing with oil or other insulating liquid, thus securing insulation that is particularly well adapted for high-potential, long-distance circuits.

In the accompanying drawings, Figure 1 is a view of a portion of a single conductor and its insulating tube sections, the latter being shown partially in section and partially in elevation. Fig. 2 is a transverse section of a conduit comprising three conductors and their insulating tubes, and Fig. 3 is a similar view showing two such conductors and their insulating tubes. Fig. 4 is a view similar to Fig. 1, showing a modified form of sectional insulating tube. Fig. 5 is a side elevation of a group of three conductors and their insulating tubes, and Fig. 6 is a similar view of two conductors and their insulating tubes.

Referring to Figs. 1, 2, 3, 5 and 6 of the drawings, 1 is a pipe or conduit which may be made of any desired material suitable for inclosing and protecting an electric conductor or conductors and the insulating material surrounding the same.

2 represents lengths of outside insulating tubing which substantially abut, end to end, and 3, lengths of inner insulating tubing, similarly arranged to break joints with those of the tubing 2. These lengths of tubing are preferably made of glass, such material being comparatively cheap and easily molded to shape and non-porous; but it is obvious that the tubing may be made of any other suitable non-conducting material.

Within the sectional tube 3 is the electric conductor 4, and around this conductor and between both insulating tubes, as well as surrounding the outer ones, is a body of oil or other insulating liquid.

In Fig. 4 we have shown a modified form of insulator in which a single set of tube sections is employed for each conductor, approximately one-half of each section being of materially less diameter than the other half, the smaller portion of the tube section being designated as 3' and the larger portion as 2'. As will be seen from the drawings, the large portion of each length of tubing extends over the smaller end of the adjacent section and substantially abuts against the larger portion of said adjacent section, the result effected being substantially the same as that secured by the use of two sets of concentric tubes, such as are shown in the other figures of the drawings.

It will be observed from the structure and arrangement of the parts described that any direct discharge from any conductor to an adjacent conductor of the system or to the ground must pass through not only the liquid insulating material, but at least one thickness of the tubing, and except where the sections of tubing join, any direct discharge must pass through two thicknesses of the solid material. It is also apparent that any path of less resistance extends not only between the two adjacent ends of the inner sections of tubing but longitudinally through half the length of a section and thence outward between adjacent sections of the outer tubing. It is clear, therefore, that a path so circuitous and of such great length is such that there is little danger of its being bridged by any current either to or from the inclosed conductor.

We not only propose to so arrange the inner and outer lengths of tubing for each conductor that they shall break joints, but also to arrange the lengths of the outer tubing of adjacent conductors so that they also shall break joints each with every other, as shown in Figs. 5 and 6. We do not wish it to be understood that we consider this last-mentioned arrangement as absolutely necessary, but it is regarded as desirable, for the reason that it affords additional protection.

While we have described a specific means for carrying our invention into effect, we do not desire to be limited to the exact details of construction, since such details may be very considerably varied without departing from the spirit and scope of our invention.

What we claim is—

1. A conduit for electric conductors comprising a plurality of non-conducting, telescoping tubes made in abutting, joint-breaking sections, and a non-conducting liquid filling the spaces between the tubes and around the conductor, substantially as described.

2. A conduit for electric conductors comprising telescoping tubes of insulating material arranged to break joints, and a body of non-conducting liquid filling the spaces in and between the tubes, substantially as described.

3. A conduit for electric conductors comprising a plurality of tubes of insulating material, each consisting of telescoping, joint-breaking sections, and all inclosed in a pipe or tube, the entire space in and around the said insulating tubes, except that occupied by the conductors, being filled with non-conducting liquid, substantially as described.

4. A conduit for electric conductors comprising a pipe or tube, a plurality of sectional, insulating tubes included therein, a sectional insulating tube in each of the first-named sectional tubes the sections of which break joints with those of its inclosing tube, and non-conducting liquid filling the space in and around said sectional tubes, substantially as described.

5. The combination with a plurality of electric conductors, of a sectional, insulating tube around each of said conductors, the sections of each tube breaking joints with those of the adjacent tube or tubes, a second set of tubes of like material, structure, and arrangement, each inclosing one of said first set, a tube or pipe surrounding all of said tubes, and a body of non-conducting liquid filling the space in and around said sectional tubes, substantially as described.

6. A system of electric distribution comprising a plurality of conductors, tubes composed of insulating material surrounding the same, a pipe inclosing said tubes and insulating liquid filling the spaces in and around the said parts, substantially as described.

In testimony whereof we have hereunto subscribed our names this 22d day of October, A. D. 1894.

LEWIS B. STILLWELL.
CHAS. F. SCOTT.

Witnesses:
JAS. WM. SMITH,
H. C. TENER.